(12) United States Patent
Hirasawa et al.

(10) Patent No.: US 10,023,104 B2
(45) Date of Patent: Jul. 17, 2018

(54) VEHICLE LIGHTING DEVICE

(71) Applicant: Stanley Electric Co., Ltd., Tokyo (JP)

(72) Inventors: Hiroshi Hirasawa, Tokyo (JP); Yasushi Yatsuda, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/349,497

(22) Filed: Nov. 11, 2016

(65) Prior Publication Data

US 2017/0138555 A1    May 18, 2017

(30) Foreign Application Priority Data

Nov. 18, 2015    (JP) ................................. 2015-225989

(51) Int. Cl.
*F21V 17/02*    (2006.01)
*B60Q 1/14*    (2006.01)
(Continued)

(52) U.S. Cl.
CPC ............... *B60Q 1/14* (2013.01); *F21S 41/14* (2018.01); *F21S 41/16* (2018.01); *F21S 41/25* (2018.01);
(Continued)

(58) Field of Classification Search
CPC .. F21S 48/1757; F21S 48/1145; F21S 48/125; F21S 48/1317; F21S 48/1388; B60Q 1/14
(Continued)

(56) References Cited

U.S. PATENT DOCUMENTS 6,043,937 A * 3/2000 Hudson .............. G02B 27/0101
359/630
6,758,582 B1 * 7/2004 Hsiao .................... F21V 7/0025
362/302
(Continued)

FOREIGN PATENT DOCUMENTS

DE    10 2013 226 622 A1    6/2015
JP    2003-172900    6/2003
(Continued)

OTHER PUBLICATIONS

The extended European search report for the related European Patent Application No. 16198861.3 dated Mar. 30, 2017.

*Primary Examiner* — Bryon T Gyllstrom
(74) *Attorney, Agent, or Firm* — Kenealy Vaidya LLP

(57) ABSTRACT

A vehicle lighting device includes a projector lens, a lens holder, a main body barrel, a bottom cover, a first to a fourth excitation light sources, an upper and a lower light deflector, a correction mirror, and a fluorescent unit. The first and the second excitation light source emit laser beams toward the rotational center of a light-deflecting mirror of the upper light deflector, and the third and the fourth excitation light source emit laser beams toward that of the lower light deflector. The correction mirror corrects the distortion of the laser beams scanned by the upper and lower light deflectors and reflects the corrected laser beams. A two-dimensional image corresponding to a predetermined light distribution pattern is drawn as a white image on the fluorescent unit by the corrected light beams, and the two-dimensional image is projected on a virtual vertical screen through the projector lens.

12 Claims, 15 Drawing Sheets

(51) Int. Cl.
*F21S 41/14* (2018.01)
*F21S 41/25* (2018.01)
*F21S 41/32* (2018.01)
*F21S 41/36* (2018.01)
*F21S 41/675* (2018.01)
*F21S 41/16* (2018.01)
*F21Y 115/30* (2016.01)
*F21S 41/365* (2018.01)

(52) U.S. Cl.
CPC ............... *F21S 41/32* (2018.01); *F21S 41/36* (2018.01); *F21S 41/675* (2018.01); *F21S 41/365* (2018.01); *F21Y 2115/30* (2016.08)

(58) Field of Classification Search
USPC .......................................................... 362/512
See application file for complete search history.

(56) References Cited

U.S. PATENT DOCUMENTS

| | | | |
|---|---|---|---|
| 7,348,584 B2* | 3/2008 | Satou | B60Q 1/14 250/516.1 |
| 8,757,846 B2* | 6/2014 | Otani | F21S 41/143 362/307 |
| 8,931,940 B2* | 1/2015 | Lai | B60Q 1/085 362/514 |
| 2005/0105301 A1* | 5/2005 | Takeda | F21S 41/16 362/545 |
| 2012/0106189 A1* | 5/2012 | Takahashi | B60Q 1/0035 362/538 |
| 2012/0224384 A1* | 9/2012 | Takahira | F21K 9/56 362/509 |

FOREIGN PATENT DOCUMENTS

| | | |
|---|---|---|
| JP | 2009-48786 A | 3/2009 |
| JP | 4881255 B2 | 2/2012 |
| WO | 2014/121315 A1 | 8/2014 |
| WO | 2015/122481 A1 | 8/2015 |

* cited by examiner

VEHICLE LIGHTING DEVICE

This application claims the priority benefit under 35 U.S.C. § 119 of Japanese Patent Application No. 2015-225989 filed on Nov. 18, 2015, which is hereby incorporated in its entirety by reference.

BACKGROUND OF THE INVENTION

Field of the Invention

The present invention relates to a vehicle lighting device equipped with a light deflector that scans light beams.

Description of the Related Art

As a vehicle lighting device to be mounted on a vehicle, there is one adapted to scan a light beam from a light source, such as a laser, by a light deflector, such as a microelectromechanical system (MEMS), draw a two-dimensional image on a fluorescent screen, and project at front the two-dimensional image in the form of a light distribution pattern. A single light source cannot provide a sufficient amount of light required of such a vehicle lighting device, so that a plurality of light sources are used.

For example, according to the vehicle lighting device described in Japanese Patent No. 4881255, light beams are emitted from three light sources to different parts of a light-deflecting mirror of a light deflector, and the light-deflecting mirror is rotated in this state to perform scanning, thereby forming three light distribution patterns. Then, the three light distribution patterns are partly overlapped to provide a desirable light distribution pattern obtained from the vehicle lighting device, in which the intensity of light is high at a center and low at an edge portion.

However, according to the vehicle lighting device described in Japanese Patent No. 4881255, the light beams from the three light sources are directed to different parts of the light-deflecting mirror, so that the size of the light-deflecting mirror has to be increased, as compared with a type adapted to emit a light beam from a single light source to a single light-deflecting mirror. If the light-deflecting mirror is made larger, then the motion thereof will be slower, thus it is not possible to obtain a higher resolution of the projected light distribution pattern.

SUMMARY OF THE INVENTION

An object of the present invention is to provide a vehicle lighting device capable of achieving a higher resolution of a light distribution pattern without increasing the size of a light-deflecting mirror.

The vehicle lighting device in accordance with the present invention is a vehicle lighting device which is configured to form a predetermined light distribution pattern and which includes: a plurality of light sources that emit light beams; a light-deflecting mirror which is disposed such that a plurality of light beams emitted from the plurality of light sources are incident at a same predetermined position and which reflects the plurality of light beams; a light deflector which scans the plurality of light beams by changing reflection directions of the plurality of light beams by the light-deflecting mirror; and an optical system which forms the predetermined light distribution pattern by the plurality of light beams scanned by the light deflector.

According to the present invention, the light beams emitted from the plurality of light sources are incident upon the same predetermined position on the light-deflecting mirror, thus enabling the light-deflecting mirror to be smaller than a type in which a plurality of light beams are incident upon different positions on the light-deflecting mirror.

The smaller light-deflecting mirror permits a higher rotational speed than the type with a larger light-deflecting mirror and also permits a higher resolution of a projected light distribution pattern.

In the present invention, the plurality of light beams reflected by the light-deflecting mirror are preferably separated and irradiated at different positions.

The plurality of light beams reflected off of the light-deflecting mirror are separated and directed to different positions, thus enabling the irradiation range to be wider than that of the type in which a plurality of light beams are directed to the same position.

In the present invention, scanning ranges of the plurality of light beams are preferably at least partly overlapped.

Since the scanning ranges of the plurality of light beams are at least partly overlapped, the overlapped part has higher intensity of light than a non-overlapped part. With this arrangement, a part having higher intensity of light can be formed, as compared with a type in which the scanning ranges of the plurality of light beams are not overlapped.

In the present invention, the vehicle lighting device is preferably equipped with a correction mirror, which is provided between the light deflector and the optical system and, which corrects distortion of the plurality of light beams scanned by the light deflector, and reflects the corrected light beams.

Since the light distortion is corrected by the correction mirror, a predetermined light distribution pattern having less distortion than that in a type not provided with a correction mirror can be formed.

Further, in the present invention, the vehicle lighting device is preferably equipped with a reflection mirror, which is provided between the plurality of light sources and the light deflector, and which reflects the plurality of light beams, which have been emitted from the plurality of light sources, toward the predetermined position of the light-deflecting mirror.

Since the vehicle lighting device has the reflection minor, which reflects the light beams, which have been emitted from the light sources, toward the predetermined position on the light-deflecting mirror, the degree of freedom of selecting the positions where the light sources are to be disposed is higher than that in a type adapted to directly emit light beams from light sources toward the light-deflecting mirror.

In the present invention, preferably, the vehicle lighting device is equipped with a projection unit, on which an image is drawn by the plurality of light beams scanned by the light deflector, and the optical system projects the image drawn on the projection unit thereby to form the predetermined light distribution pattern.

Since the image drawn on the projection unit by the plurality of light beams scanned by the light deflector is projected by the optical system, excitation light sources can be used as the light sources.

DESCRIPTION OF THE PREFERRED EMBODIMENTS

[First Embodiment]

Figure 1:
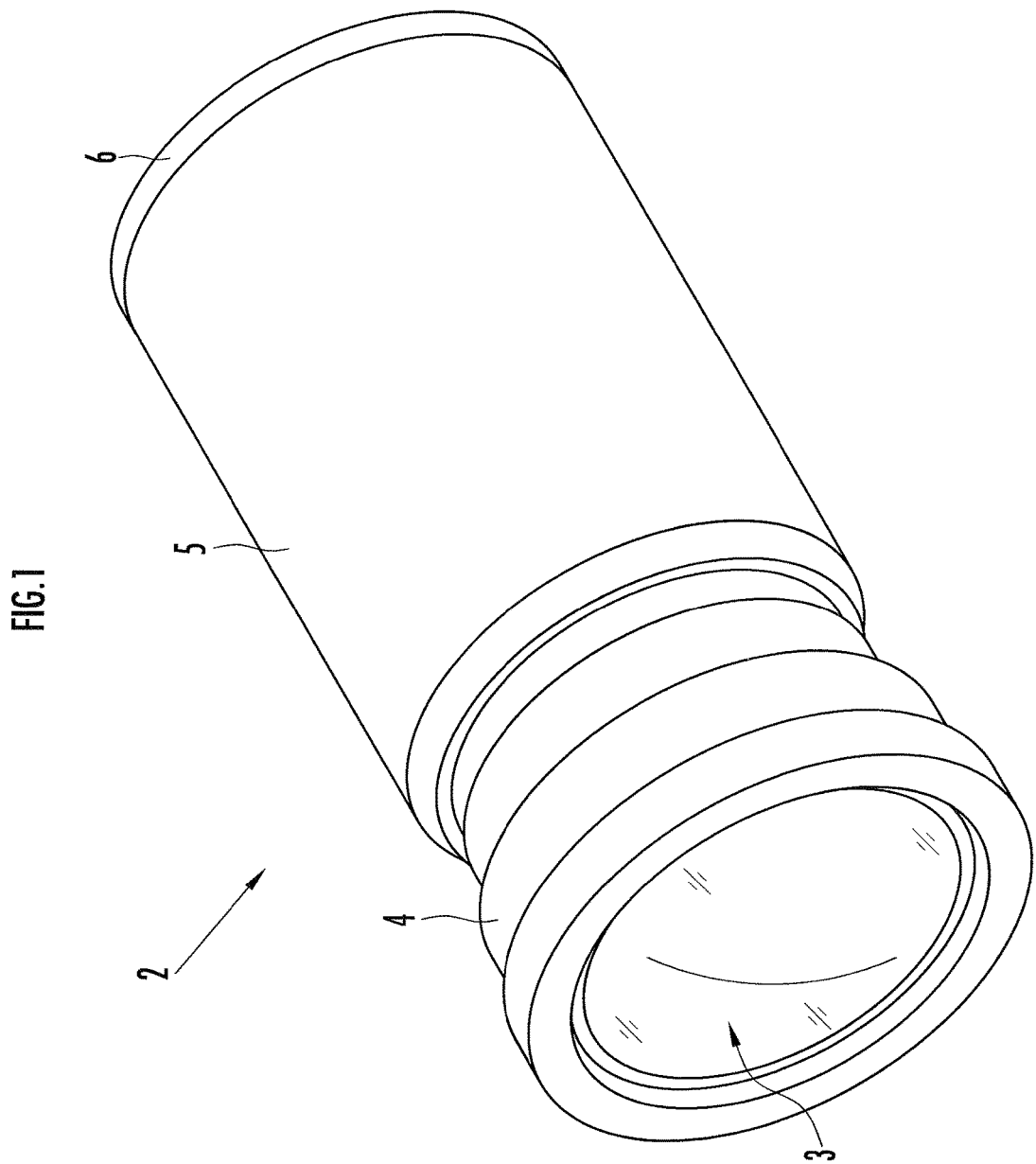
FIG. 1 is a perspective view illustrating a vehicle lighting device according to first embodiment.

Referring to FIG. 1, a vehicle lighting device 2 has a projector lens 3, a lens holder 4 which holds the projector lens 3, a main body barrel 5 attached to the rear end of the lens holder 4, and a bottom cover 6 which closes the opening on the rear side of the main body barrel 5. In the present embodiment, the vehicle lighting device 2 is used as, for example, a headlight of a vehicle.

Figure 2:
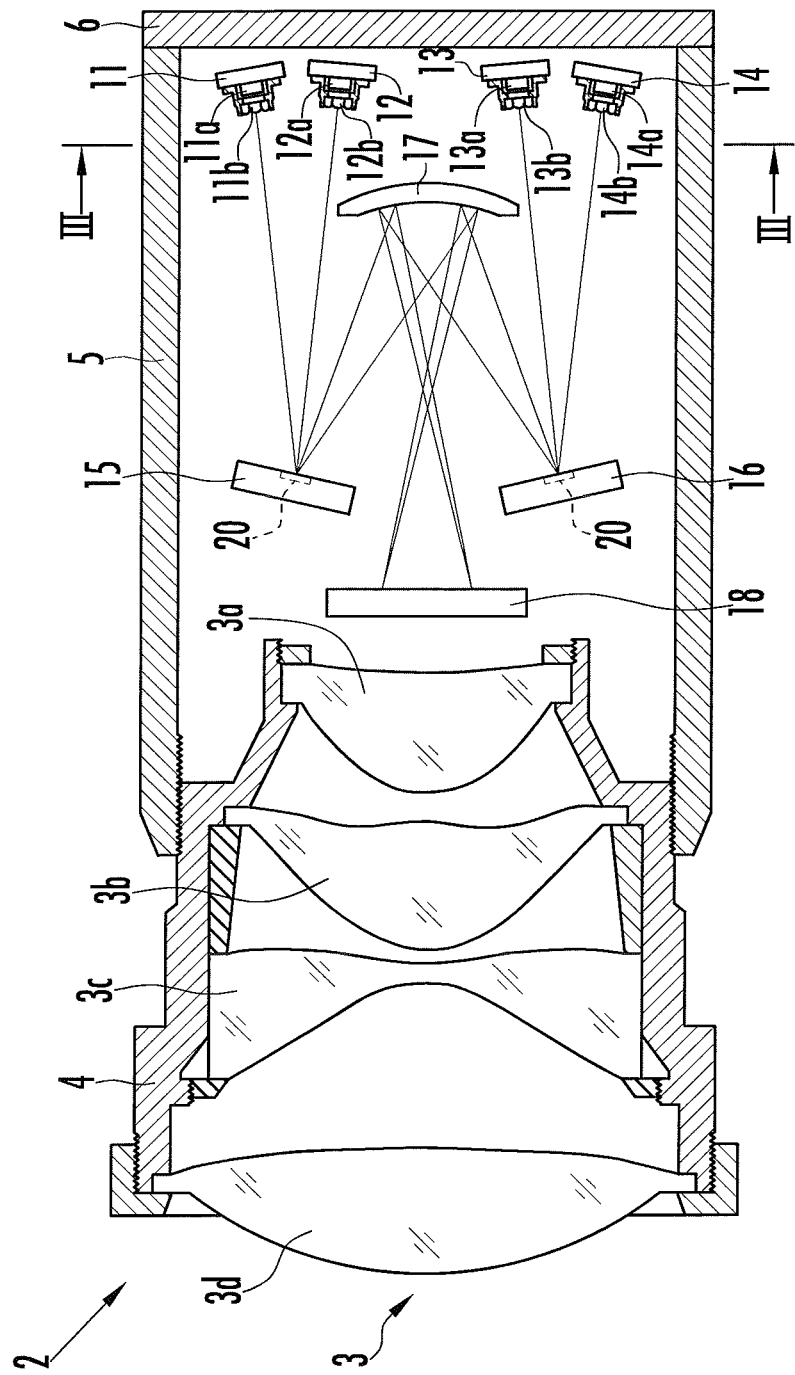
FIG. 2 is a sectional view of the vehicle lighting device.

Referring to FIG. 2, the vehicle lighting device 2 has a first to a fourth excitation light sources 11 to 14, an upper light deflector 15, which scans the excitation light beams from the first and the second excitation light sources 11 and 12 in a two-dimensional manner (in a horizontal direction and a vertical direction), and a lower light deflector 16, which scans the excitation light beams from the third and the fourth excitation light sources 13 and 14 in the two-dimensional manner. Hereinafter, the upper light deflector 15 and the lower light deflector 16 will be combined and referred to as the upper and lower light deflectors 15, 16. The drive of the first to the fourth excitation light sources 11 to 14 and the upper and lower light deflectors 15, 16 is controlled by a control unit 19 (refer to FIG. 4), which will hereinafter be discussed in detail.

Further, the vehicle lighting device 2 has a correction mirror 17 which corrects the distortion of the light beams scanned by the upper and lower light deflectors 15, 16 (to hereinafter be discussed in detail), and a fluorescent unit 18 (projection unit) on which a two-dimensional image corresponding to a predetermined light distribution pattern is drawn by the light beams corrected by the correction mirror 17. The two-dimensional image drawn on the fluorescent unit 18 is projected at front through the projector lens 3.

The excitation light sources 11 to 14, the upper and lower light deflectors 15, 16, the correction mirror 17, and the fluorescent unit 18 are disposed inside the main body barrel 5 and secured by fixing members (not illustrated). The outer peripheral surface of the main body barrel 5 may be provided with a heat radiation fin.

The first excitation light source 11 has a semiconductor light-emitting element 11a, such as a laser diode (LD) which emits a laser beam in, for example, a blue color range (e.g. an emission wavelength of 450 nm), as the excitation light beam, and a condenser lens 11b which condenses (e.g. collimates) the light beam from the semiconductor light-emitting element 11a.

Similar to the first excitation light source 11, the excitation light sources 12 to 14 have semiconductor light-emitting elements 12a, 13a and 14a, respectively, and condenser lenses 12b, 13b and 14b, respectively. The semiconductor light-emitting elements 11a to 14a may be semiconductor light-emitting elements, such as laser diodes which emit laser beams in a near-ultraviolet range (e.g. an emission wavelength of 405 nm). Further, the semiconductor light-emitting elements 11a to 14a may be LEDs, or laser irradiators which emit laser beams obtained by RGB color mixing.

The first excitation light source 11 and the second excitation light source 12 emit laser beams toward the rotational center of a light-deflecting mirror 20 of the upper light deflector 15, which will hereinafter be discussed in detail. The third excitation light source 13 and the fourth excitation light source 14 emit laser beams toward the rotational center of the light-deflecting mirror 20 of the lower light deflector 16, which will hereinafter be discussed in detail.

Figure 3:
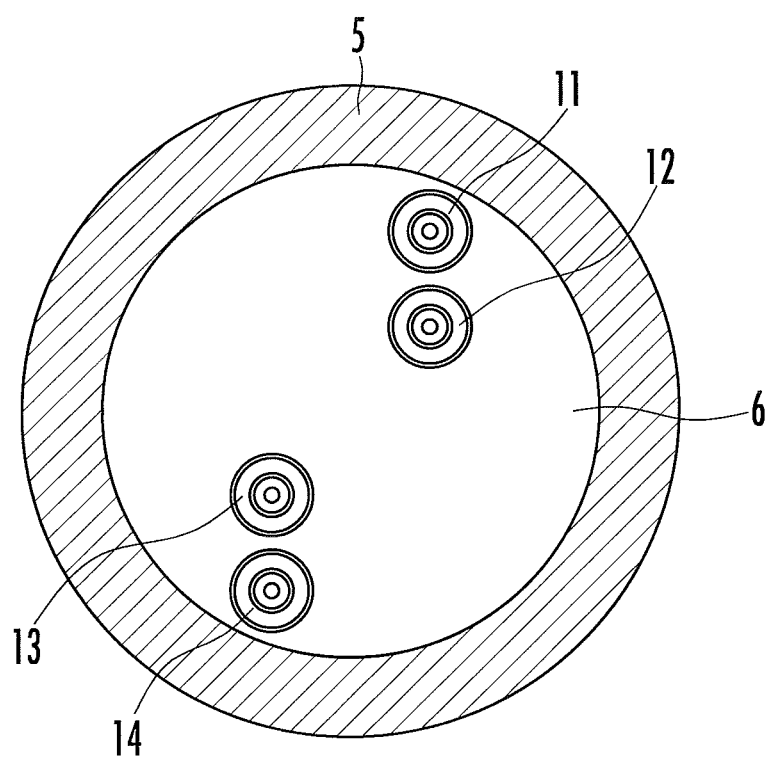
FIG. 3 is a sectional view taken along line III-III in FIG. 2.

The excitation light sources 11 to 14 are arranged in the order of the first excitation light source 11, the second excitation light source 12, the third excitation light source 13, and the fourth excitation light source 14 from the top. Further, as illustrated in FIG. 3, the first excitation light source 11 and the second excitation light source 12, and the third excitation light source 13 and the fourth excitation light source 14 are disposed at the positions away from each other in the lateral direction, as viewed from the front. This is because the light beams from the light sources 11 to 14 are individually scanned in different ranges, as will hereinafter be described in detail. The first excitation light source 11 and the second excitation light source 12 have different relative positional relationships with respect to the upper light deflector 15 in the vertical direction and also differ in the irradiation angle of light and the angle of reflected light. Thus, the first excitation light source 11 and the second excitation light source 12 differ in the scanning range in the vertical direction. Similarly, the third excitation light source 13 and the fourth excitation light source 14 differ in the scanning range in the vertical direction.

As illustrated in FIG. 2, the light beams scanned by the upper and lower light deflectors 15, 16 enter the correction mirror 17. The light beams scanned by the upper and lower light deflectors 15, 16 are distorted due to the influences of the angle of incidence of the light beams upon the light-deflecting mirror 20 and the rotation axis of the light-deflecting mirror 20.

The correction mirror 17 is adapted to correct the distortion of the light beams scanned by the upper and lower light deflectors 15, 16 and reflect the corrected light beams, and has a curved reflection surface. The shape of the correction mirror 17 can be changed as necessary, or the correction mirror 17 may be composed of a plurality of mirrors. If a plurality of mirrors is provided, then the mirrors will be provided, matching the upper and lower light deflectors 15, 16 or the scan beams of the first to the fourth excitation light sources 11 to 14.

The fluorescent unit 18 is adapted to receive the laser beams, which have been scanned by the upper light deflector 15 and the lower light deflector 16 in the two-dimensional manner and corrected by the correction mirror 17, and to convert at least a part of the laser beams to light beams of a different wavelength. The fluorescent unit 18 has an appearance like a rectangular plate (layer). The fluorescent unit 18 is disposed in the vicinity of the focal point of the projector lens 3. In FIG. 2, the thickness of the fluorescent unit 18 is exaggerated.

For example, if the laser diodes (LDs) that emit laser beams in the blue color range are used as the semiconductor light-emitting elements 11a to 14a of the excitation light sources 11 to 14, then a fluorescent unit that is excited by a laser beam in the blue color range and emits a yellow light beam is used as the fluorescent unit 18. A two-dimensional image corresponding to a predetermined light distribution pattern is drawn as a white image on the fluorescent unit 18 by a laser beam in the blue color range that has been scanned in the two-dimensional manner by the upper light deflector 15 and the lower light deflector 16 and then corrected by the correction mirror 17. The two-dimensional image is drawn as the white image because, if the laser beam in the blue color range is emitted, then the fluorescent unit 18 emits white light (pseudo-white light) resulting from the mixture of the laser beam in the blue color range transmitting (passing) therethrough and the emission of light (the yellow light) obtained from the laser beam in the blue color range.

Meanwhile, if the laser diodes (LDs) that emit laser beams in the near-ultraviolet range are used as the semiconductor light-emitting elements 11a to 14a, then a fluorescent unit that is excited by a laser beam in the near-ultraviolet range and emits light beams of three colors, namely, red, green and blue, is used as the fluorescent unit 18. A two-dimensional image corresponding to a predetermined light distribution pattern is drawn as a white image on the fluorescent unit 18 by a laser beam in the near-ultraviolet range that has been scanned in the two-dimensional manner by the upper light deflector 15 and the lower light deflector 16 and then corrected by the correction mirror 17. The two-dimensional image is drawn as the white image because, if the laser beam in the near-ultraviolet range is emitted, then the fluorescent unit 18 emits white light (pseudo-white light) resulting from the mixture of light (light of three colors, namely, red, green and blue) of the laser beam in the near-ultraviolet range. Alternatively, a blue fluorescent unit and a yellow fluorescent unit may be excited by the near-ultraviolet laser beams to emit the white light.

The projector lens 3 is composed of four lenses, 3a to 3d, and the lenses 3a to 3d are retained by the lens holder 4. The aberration (the field curvature) of each of the lenses 3a to 3d is corrected such that the field will be a plane, and the chromatic aberration thereof is also corrected. In this case, a fluorescent unit shaped like a flat plate is used as the fluorescent unit 18, which is disposed along the field (the plane).

The focal point of the projector lens 3 is positioned in the vicinity of the fluorescent unit 18. The projector lens 3 makes it possible to remove the influence of the aberration with respect to the predetermined light distribution pattern, as compared with the case where a single convex lens is used. Further, the flat-plate shape of the fluorescent unit 18 permits easier fabrication than in the case where the fluorescent unit 18 has a curved surface. In addition, the flat-plate shape of the fluorescent unit 18 allows two-dimensional images to be drawn more easily than in the case where the fluorescent unit 18 has a curved surface.

The projector lens 3 may be a projector lens composed of a single aspherical lens in which the correction of the aberration (the field curvature) for making the field flat is not made. In this case, a fluorescent unit having a curvature that matches the field curvature is used as the fluorescent unit 18, which is disposed along the field curvature.

The projector lens 3 projects at front the two-dimensional image drawn on the fluorescent unit 18 and forms, for example, a high beam light distribution pattern HP, as the predetermined light distribution pattern on a virtual vertical screen S (disposed at a position approximately 25 meters in front of the vehicle lighting device 2), which directly opposes the vehicle lighting device 2.

The upper light deflector 15 scans, in the horizontal direction and the vertical direction, the excitation light condensed by the condenser lenses 11b and 12b of the first and the second excitation light sources 11 and 12, respectively. The lower light deflector 16 scans, in the horizontal direction and the vertical direction, the excitation light condensed by the condenser lenses 13b and 14b of the third and the fourth excitation light sources 13 and 14, respectively.

Figure 4:
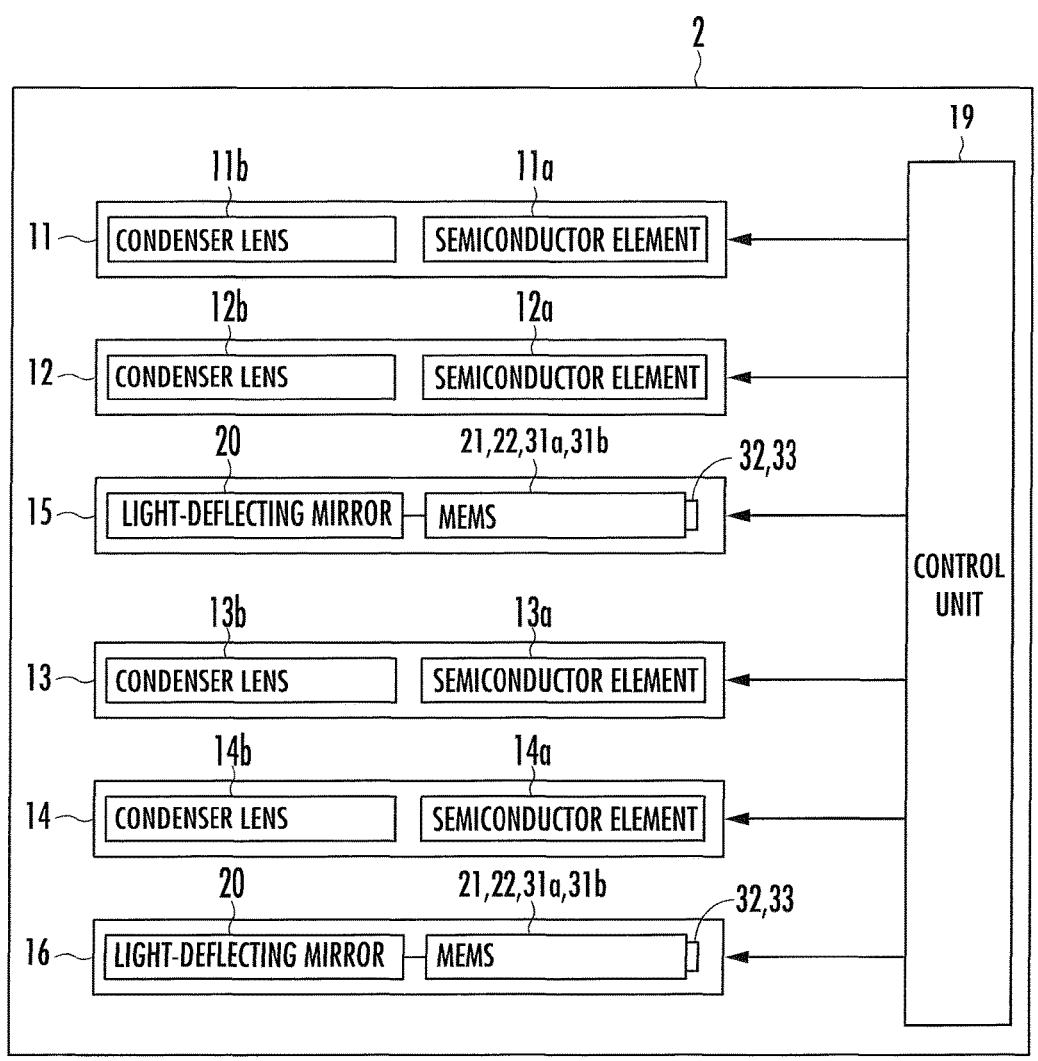
FIG. 4 is a block diagram illustrating the configuration of the vehicle lighting device.

As illustrated in FIG. 4, the first to the fourth excitation light sources 11 to 14, the upper light deflector 15 and the lower light deflector 16 are connected to the control unit 19, which controls the vehicle lighting device 2 in a centralized manner, and the drive thereof is controlled by the control unit 19. The upper and lower light deflectors 15, 16 are, for example, MEMS scanners.

The drive method of a light deflector roughly comes in a piezoelectric method, an electrostatic method, and an electromagnetic method, and any one of these methods can be used. In the present embodiment, light deflectors based on the piezoelectric method will be representatively described.

Figure 5:
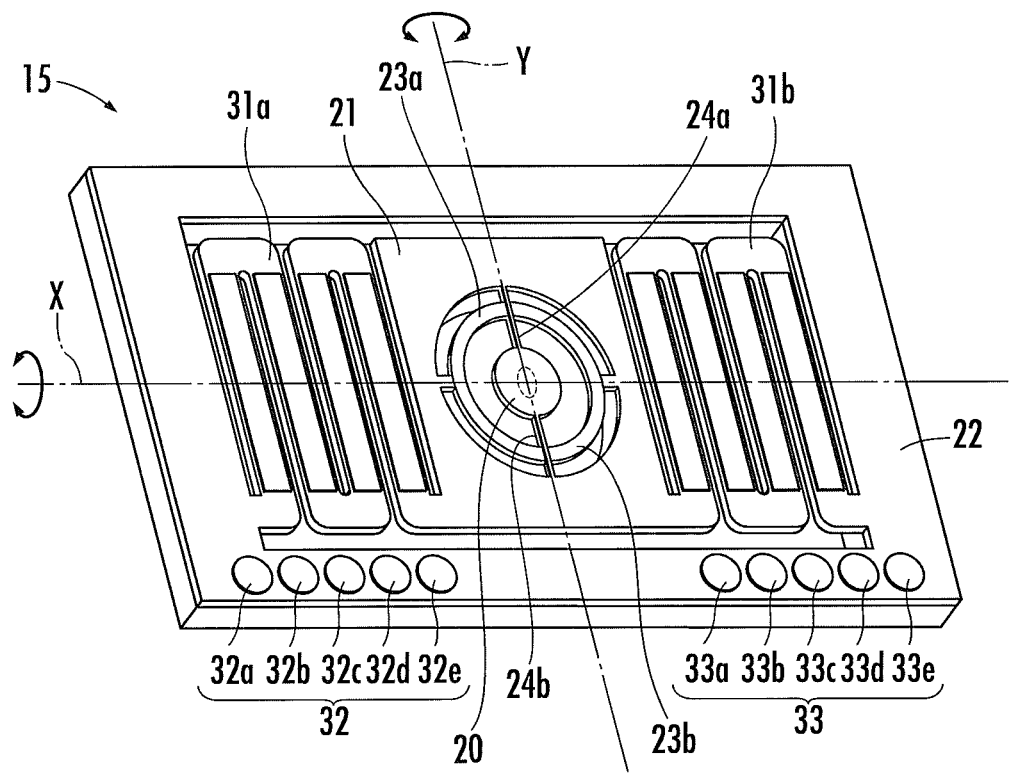
FIG. 5 is a perspective view illustrating an upper light deflector.

Referring to FIG. 5, the upper light deflector 15 is a two-axis light deflector and fabricated using a semiconductor process or the microelectromechanical system (MEMS) technique. A light beam entering from a certain direction is reflected off of the light-deflecting mirror 20 serving as a rotating micro mirror and then output as reflected light (laser beam).

The upper light deflector 15 has a first support assembly 21. The first support assembly 21 is composed mainly of the light-deflecting mirror 20, semi-circular piezoelectric actuators 23a, 23b, and torsion bars 24a, 24b. The laser beams from the excitation light sources 11 and 12 are reflected off of the light-deflecting mirror 20, and the reflected light (laser beam) scans on the virtual vertical screen S via the correction mirror 17, the fluorescent unit 18, and the projector lens 3.

At this time, the control unit 19 transmits control signals to the upper light deflector 15 and the excitation light sources 11, 12. In response to the control signals, the semi-circular piezoelectric actuators 23a, 23b of the upper light deflector 15 are driven, and the torsion bars 24a, 24b connected to the semi-circular piezoelectric actuators 23a, 23b are twisted, thus circularly moving the light-deflecting mirror 20. Further, turning on/off and the brightness of a laser beam is controlled in the excitation light sources 11, 12 according to the control signals.

According to the present embodiment, in a two-axis Cartesian coordinate system, the axis of rotation in the horizontal direction passing through the center of the circular light-deflecting mirror 20 is defined as the X-axis, and the axis of rotation in the vertical direction is defined as the Y-axis. Further, in FIG. 5, the X-axis denotes the lateral direction, the Y-axis denotes the vertical direction, and the direction of the thickness of the light-deflecting mirror 20 denotes the longitudinal direction.

The upper light deflector 15 includes a rectangular ring-shaped second support assembly 22, and the first support assembly 21 is provided at the center of the second support assembly 22. Further, accordion-like piezoelectric actuators 31a, 31b are arranged line-symmetrically with respect to the Y-axis passing through the center of the first support assembly 21, and connected to the side lower ends of the first support assembly 21 and the second support assembly 22. In FIG. 4, the first and the second support assemblies 21 and 22, and the piezoelectric actuators 31a and 31b are generically referred to as the MEMS.

The piezoelectric actuators 31a, 31b are formed to have a meander structure, in which a plurality of cantilevers are arranged such that the longer sides of the cantilevers are adjacent to each other and the ends thereof in the vertical direction are folded back so as to be connected in series. Although the detailed description will be given later, driving the piezoelectric actuators 31a, 31b according to the control signals causes the first support assembly 21 to circularly move in a reciprocating manner in the horizontal direction, i.e. circularly move in the reciprocating manner about the X-axis line that passes through the center of the light-deflecting minor 20 in the drawing. Further, as described above, driving the semi-circular piezoelectric actuators 23a, 23b causes the light-deflecting mirror 20 to circularly move in the reciprocating manner about the Y-axis line, which coincides with the axes of the torsion bars 24a, 24b and which passes through the center of the light-deflecting mirror 20 in the drawing.

As a result, when a laser beam is reflected off of the light-deflecting mirror 20, the upper light deflector 15 can output the light beam to the front of the upper light deflector 15 and then scan the beam in two directions, namely, the X-axis direction and the Y-axis direction.

Electrode pads 32a to 32e (hereinafter referred to as "the electrode pads 32") and electrode pads 33a to 33e (hereinafter referred to as "the electrode pads 33") are arranged below the second support assembly 22. The electrode pads 32, 33 are electrically connected so as to be enabled to apply drive voltages to the electrodes of the piezoelectric actuators 31a, 31b and the semi-circular piezoelectric actuators 23a, 23b.

The function as the light deflector can be implemented even without the piezoelectric actuators 31a, 31b. In this case, the first support assembly 21 serves as the support member and the light-deflecting mirror 20 constitutes a single-axis light deflector that circularly moves in the reciprocating manner about the Y-axis line.

Referring now to FIG. 6, the operation will be described, taking the piezoelectric actuator 31a as an example. As described above, the upper light deflector 15 actuates the piezoelectric actuators 31a, 31b thereby to enable the light-deflecting mirror 20 to circularly move in the reciprocating manner about the X-axis line.

Figure 6A:
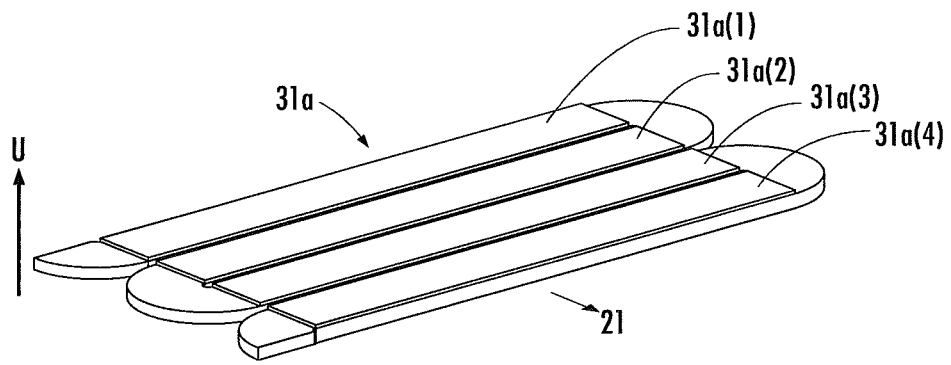
FIG. 6A and FIG. 6B are diagrams illustrating the operation of a piezoelectric actuator having a meander structure.

FIG. 6A is a cutout diagram illustrating the piezoelectric actuator 31a disposed on the left when the upper light deflector 15 is observed from the front side. The piezoelectric actuator 31a includes four piezoelectric cantilevers, namely, piezoelectric cantilevers 31a(1), 31a(2), 31a(3), and 31a(4) arranged in this order from the one positioned farthest from the first support assembly 21.

For example, in the piezoelectric actuator 31a, a first voltage is applied to the odd-numbered piezoelectric cantilevers 31a(1) and 31a(3). Further, a second voltage, which has a phase opposite from that of the first voltage, is applied to the even-numbered piezoelectric cantilevers 31a(2) and 31a(4).

Figure 6B:
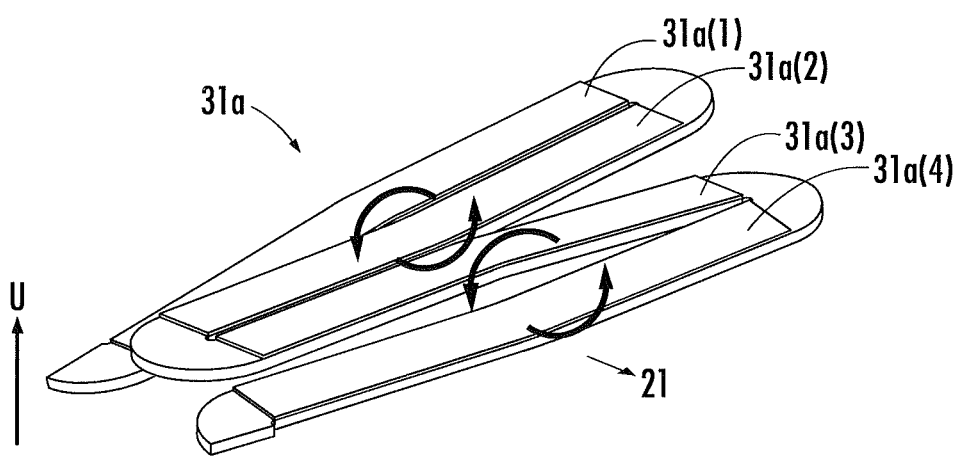

As illustrated in FIG. 6B, applying the voltages as described above makes it possible to bend and displace the odd-numbered piezoelectric cantilevers 31a(1) and 31a(3) in the upward direction in FIG. 6B, and to bend and displace the even-numbered piezoelectric cantilevers 31a(2) and 31a(4) in the downward direction in FIG. 6B.

Similar to the piezoelectric actuator 31a, the piezoelectric actuator 31b is composed of four piezoelectric cantilevers, namely, a first, a second, a third, and a fourth piezoelectric cantilevers arranged in this order from the one positioned closest to the first support assembly 21. The piezoelectric actuator 31b can bend and displace the two odd-numbered piezoelectric cantilevers to the rear side in FIG. 5, and bend and displace the two even-numbered piezoelectric cantilevers to the front in FIG. 5.

Thus, the light-deflecting mirror 20 can be displaced such that the upper side (the torsion bar 24a side) of the light-deflecting mirror 20 in FIG. 5 is positioned on the front side in FIG. 5 (the upper side moves in a direction U in FIG. 6) with respect to the lower side (the torsion bar 24b side) of the light-deflecting mirror 20 in FIG. 5.

Further, the second voltage is applied to the odd-numbered piezoelectric cantilevers 31a(1) and 31a(3), and the first voltage is applied to the even-numbered piezoelectric cantilevers 31a(2) and 31a(4). This enables the light-deflecting mirror 20 to be displaced such that the lower side (the torsion bar 24b side) of the light-deflecting mirror 20 in FIG. 5 is positioned on the front side in FIG. 5 with respect to the upper side (the torsion bar 24a side) of the light-deflecting mirror 20 in FIG. 5. The light-deflecting mirror 20 can be circularly moved (swung) about the X-axis line by continuously performing the control described above.

The lower light deflector 16 has the same configuration as the upper light deflector 15, so that the detailed description thereof will be omitted.

As a method available for applying the first voltage and the second voltage, voltages of opposite phases that change in a sine curve pattern or a comb-teeth pattern are applied to the odd-numbered piezoelectric cantilevers and the even-numbered piezoelectric cantilevers. Further, the cantilevers may not be necessarily bent alternately in the vertical direction. As an alternative method, a state in which the cantilevers are bent in the upward or downward direction and a state in which the cantilevers are not bent may be alternately repeated.

To form the high beam light distribution pattern HP on the virtual vertical screen S by driving the vehicle lighting device 2, the control unit first transmits the control signals to the first to the fourth excitation light sources 11 to 14, the upper light deflector 15 and the lower light deflector 16. In response to the control signals, the laser beams are output from the first to the fourth excitation light sources 11 to 14, and the upper light deflector 15 and the lower light deflector 16 are driven to cause the light-deflecting mirrors 20 thereof to circularly move about the X-axis and the Y-axis.

As illustrated in FIG. 2, the laser beams output from the first and the second excitation light sources 11, 12 are incident upon the rotational center of the light-deflecting mirror 20 of the upper light deflector 15, and scanned in the horizontal direction and the vertical direction by the light-deflecting mirror 20, which circularly moves. The dotted-line ellipse of the light-deflecting mirror 20 illustrated in FIG. 5 indicates the laser spots of the light beams output from the first and the second excitation light sources 11, 12. The laser spots of the light beams from the first and the second excitation light sources 11, 12 overlap at the same position on the light-deflecting mirror 20.

The laser beams output from the third and the fourth excitation light sources 13, 14 are incident upon the rotational center of the light-deflecting mirror 20 of the lower light deflector 16, and scanned in the horizontal direction and the vertical direction by the light-deflecting mirror 20, which circularly moves.

Figure 7A:
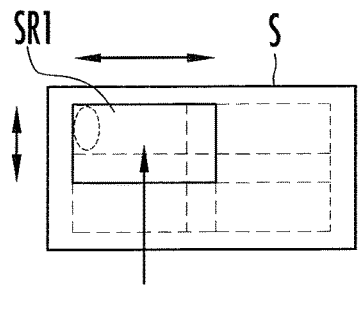
FIG. 7A to FIG. 7E are schematic diagrams in which FIG. 7A to FIG. 7D illustrating the scanning ranges on a virtual vertical screen, and FIG. 7E illustrating a high beam light distribution pattern on the virtual vertical screen.

As illustrated in FIG. 7A, the laser beam emitted from the first excitation light source 11 is scanned in a first scanning range SR1 (a two-dimensional image is projected) at top left of the virtual vertical screen S via the upper light deflector 15, the correction mirror 17, the fluorescent unit 18, and the projector lens 3.

Figure 7E:
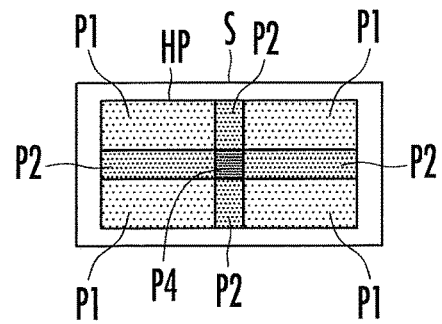
Figure 7B:
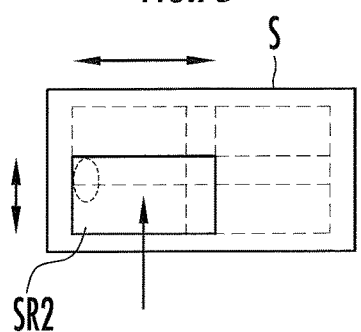

As illustrated in FIG. 7B, the laser beam emitted from the second excitation light source 12 is scanned in a second scanning range SR2 at bottom left of the virtual vertical screen S via the upper light deflector 15, the correction mirror 17, the fluorescent unit 18, and the projector lens 3.

Figure 7C:
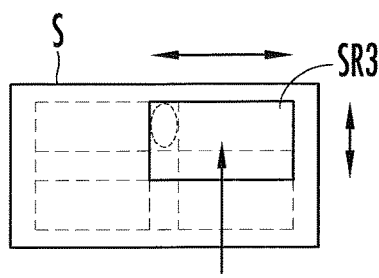

As illustrated in FIG. 7C, the laser beam emitted from the third excitation light source 13 is scanned in a third scanning range SR3 at top right of the virtual vertical screen S via the lower light deflector 16, the correction mirror 17, the fluorescent unit 18, and the projector lens 3.

Figure 7D:
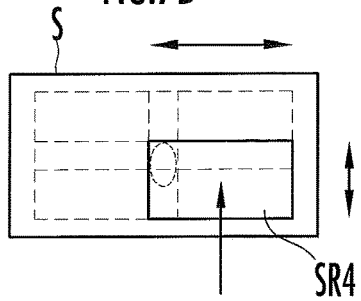

As illustrated in FIG. 7D, the laser beam emitted from the fourth excitation light source 14 is scanned in a fourth scanning range SR4 at bottom right of the virtual vertical screen S via the lower light deflector 16, the correction mirror 17, the fluorescent unit 18, and the projector lens 3. In the present embodiment, the first to the fourth scanning ranges SR1 to SR4 are substantially the same size.

The first scanning range SR1 and the second scanning range SR2 overlap at the central part in the vertical direction of the virtual vertical screen S. Further, the third scanning range SR3 and the fourth scanning range SR4 overlap at the central part in the vertical direction of the virtual vertical screen S. In addition, the first scanning range SR1 and the second scanning range SR2, and the third scanning range SR3 and the fourth scanning range SR4 overlap at the central part in the lateral direction of the virtual vertical screen S.

As illustrated in FIG. 7E, due to the overlap of the first to the fourth scanning ranges SR1 to SR4, the high beam light distribution pattern HP on the virtual vertical screen S is divided into a region P1 in which a single light beam is scanned, a region P2 in which two light beams are scanned, and a region P4 in which four light beams are scanned. According to the present embodiment, as the number of light beams to be scanned increases, there will be more light beams that can be overlapped, thus enabling the intensity of light to be increased. In other words, a highest intensity of light can be obtained in the region P4, in which four light beams are scanned. The dotted lines of the ellipse illustrated in FIG. 7A to FIG. 7D indicate the laser spots of the light beams from the first to the fourth excitation light sources 11 to 14 at the same instant. The laser spots overlapping on the same light-deflecting mirror 20 are separated on the virtual vertical screen S rather than overlapping. The laser spots are also separated on the fluorescent unit 18.

The laser beams output from the first and the second excitation light sources 11 and 12 are incident upon the same position (the rotational center) of the light-deflecting mirror 20 of the upper light deflector 15, thus permitting a reduced size of the light-deflecting mirror 20, as compared with the type in which a plurality of laser beams are incident upon different positions of a light-deflecting mirror, as in the case of Japanese Patent No. 4881255. Similarly, the laser beams output from the third and the fourth excitation light sources 13 and 14 are incident upon the rotational center of the light-deflecting mirror 20 of the lower light deflector 16, thus permitting a reduced size of the light-deflecting mirror 20. The smaller mirror permits a higher rotational speed, as compared with a larger mirror, thus permitting a higher resolution of a light distribution pattern.

Further, the laser beams output from the first and the second excitation light sources 11 and 12 are scanned in the separated state on the fluorescent unit 18 and the virtual vertical screen S. This makes it possible to perform control whereby to skip the light beams only at a desired position (to turn off the light sources at a desired scan position) without influencing the entire distribution of the intensity of light. According to the type described in the Japanese Patent No. 4881255, in which the distribution of the intensity of light is established in advance on the light-deflecting mirror, a single laser spot extends to regions having different distributions of the intensity of light, thus making it impossible to skip the light beam only at a desired position without influencing the entire distribution of the intensity of light.

The high beam light distribution pattern requires that the intensity of light at the central part be the highest. According to the present embodiment, the region P4, in which four light beams are scanned, corresponds to the central part of the high beam light distribution pattern HP, thus enabling the intensity of light at the central part to be the highest.

The high beam light distribution pattern HP is formed of the first to the fourth scanning ranges SR1 to SR4, so that each of the first to the fourth scanning ranges SR1 to SR4 is smaller than or approximately a quarter of the high beam light distribution pattern HP. Hence, the angle of scanning by the upper light deflector 15 and the lower light deflector 16 can be reduced, as compared with a type adapted to scan a single light beam by a light deflector and form the high beam light distribution pattern HP. The reduced angle of scan leads to reduced load on the upper light deflector 15 and the lower light deflector 16 with a resultant longer service life.

Further, since the region P4, in which four light beams are scanned, is positioned at the central part of the high beam light distribution pattern HP, the amount of light of each of the light beams emitted from the first to the fourth excitation light sources 11 to 14 can be reduced, as compared with a type adapted to form the high beam light distribution pattern from a light beam emitted from a single excitation light source. Hence, an excitation light source of a lower output can be used, thus permitting a reduced cost.

Further, the part in which the first scanning range SR1 and the second scanning range SR2 overlap is the turn-round part of the reciprocating rotational movement of the light-deflecting mirror 20 of the upper light deflector 15 when scanning a light beam in the vertical direction. At this turn-round part, the rotational movement of the light-deflecting mirror 20 is temporarily stopped. This means that the light irradiation time is longer in the turn-round part than in the remaining part, so that the intensity of light can be increased. In the present embodiment, the turn-round part is set to be the central part in the vertical direction of the virtual vertical screen S, thus enabling the intensity of light at the central part to be high.

Similarly, the part in which the third scanning range SR3 and the fourth scanning range SR4 overlap is the turn-round part of the reciprocating rotational movement of the light-deflecting mirror 20 of the lower light deflector 16 when scanning a light beam in the vertical direction. In the present embodiment, the turn-round part is set to be the central part in the vertical direction of the virtual vertical screen S, thus enabling the intensity of light at the central part to be high.

Further, the part in which the first scanning range SR1 and the second scanning range SR2 overlap the third scanning range SR3 and the fourth scanning range SR4 is the turn-round part of the reciprocating rotational movements of the light-deflecting mirrors 20 of the upper and lower light deflectors 15 and 16 when scanning a light beam in the horizontal direction. In the present embodiment, the turn-round part is set to be the central part in the lateral direction of the virtual vertical screen S, thus enabling the intensity of light at the central part to be high.

Figure 8:
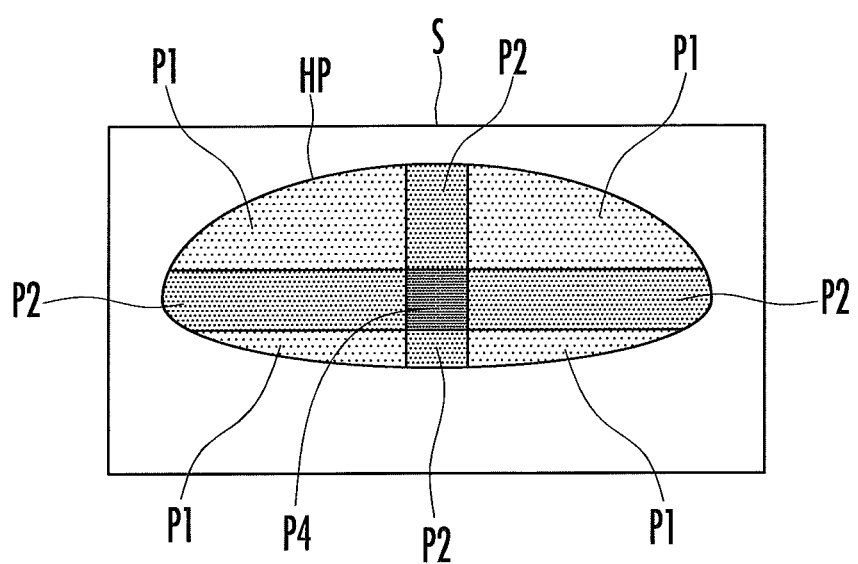
FIG. 8 is a schematic diagram illustrating an elliptical high beam light distribution pattern.

Referring to FIG. 8, an elliptical high beam light distribution pattern HP can be formed by controlling the brightness of the first to the fourth excitation light sources 11 to 14 by the control unit 19. Further, the intensity of light may be gradually decreased outward from the central part by controlling the brightness of the first to the fourth excitation light sources 11 to 14.

Further, the number of the light deflectors and the number of the excitation light sources emitting light beams to one light deflector can be changed as appropriate, and no correction mirror may be provided.

[Second Embodiment]

Figure 9:
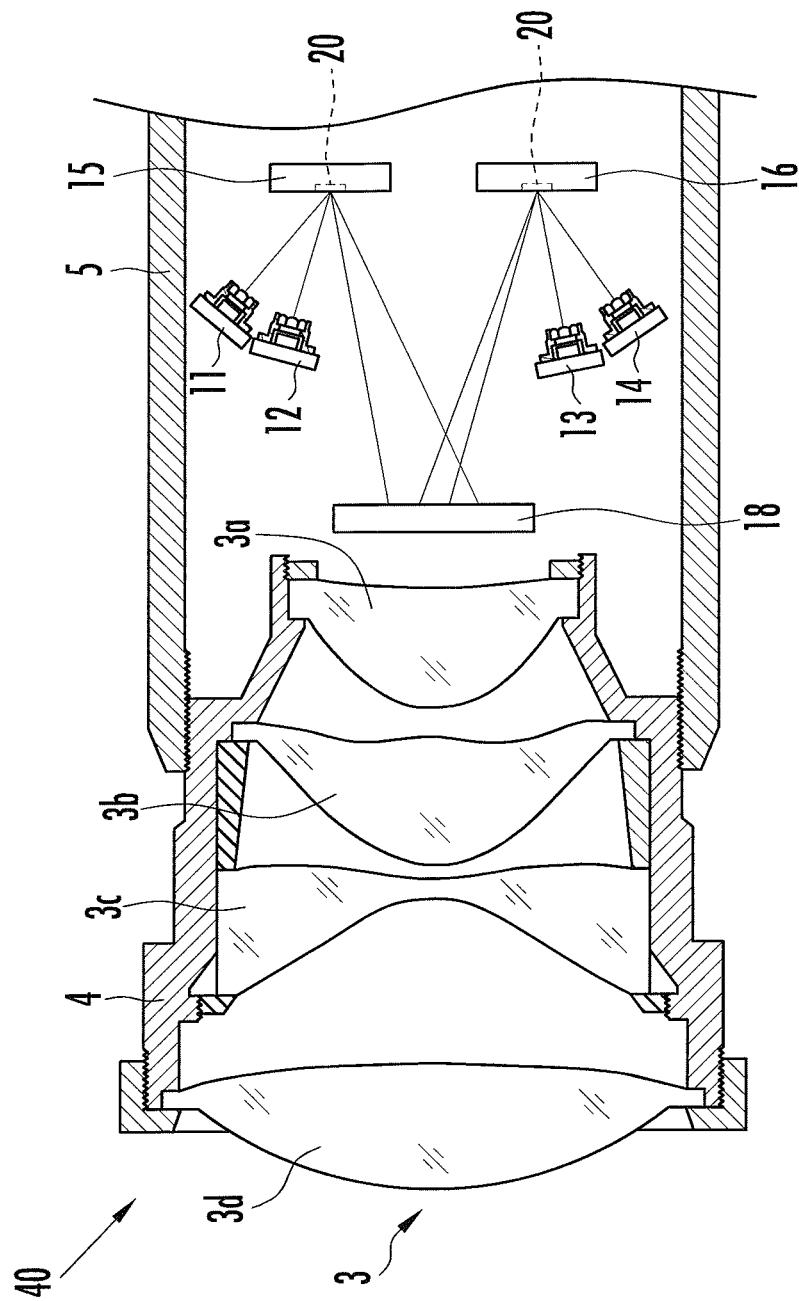
FIG. 9 is a sectional view illustrating a vehicle lighting device according to a second embodiment.

In the embodiment illustrated in FIG. 9 and FIG. 10, a vehicle lighting device 40 is equipped with a first to a fourth excitation light sources 11 to 14, an upper light deflector 15 and a lower light deflector 16, but not equipped with the correction mirror 17. The first and the second excitation light sources 11 and 12 emit light beams toward the rotational center of a light-deflecting mirror 20 of the upper light deflector 15, while the third and the fourth excitation light sources 13 and 14 emit light beams toward the rotational center of a light-deflecting mirror 20 of the lower light deflector 16. The constituent members that are the same as those in the foregoing embodiment will be assigned the same reference symbols and the detailed descriptions thereof will be omitted.

Figure 10A:
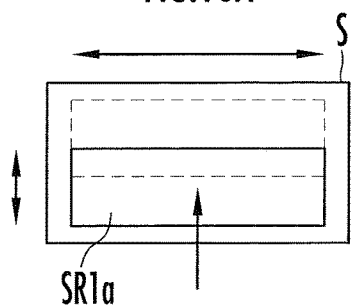
FIG. 10A to FIG. 10E are schematic diagrams in which FIG. 10A to FIG. 10D illustrating a first to a fourth scanning ranges on a virtual vertical screen in the second embodiment, and FIG. 10E illustrating a high beam light distribution pattern on the virtual vertical screen in the second embodiment.

As illustrated in FIG. 10A, a laser beam emitted from the first excitation light source 11 is scanned in the horizontal direction and the vertical direction by the upper light deflector 15 and then scanned in a first scanning range SR1a of a virtual vertical screen S via a fluorescent unit 18 and a projector lens 3.

Figure 10E:
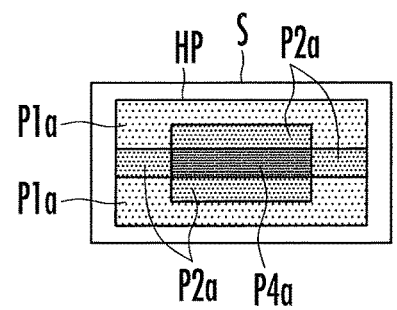
Figure 10B:
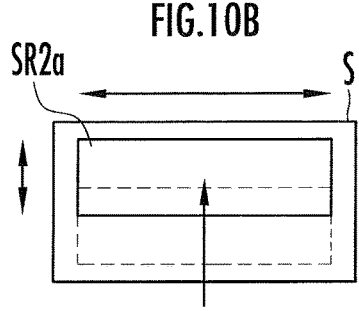

As illustrated in FIG. 10B, a laser beam emitted from the second excitation light source 12 is scanned in the horizontal direction and the vertical direction by the lower light deflector 16 and then scanned in a second scanning range SR2a of the virtual vertical screen S via the fluorescent unit 18 and the projector lens 3.

Figure 10C:
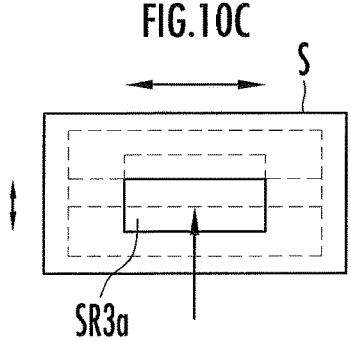

As illustrated in FIG. 10C, a laser beam emitted from the third excitation light source 13 is scanned in the horizontal direction and the vertical direction by the lower light deflector 16 and then scanned in a third scanning range SR3a of the virtual vertical screen S via the fluorescent unit 18 and the projector lens 3.

Figure 10D:
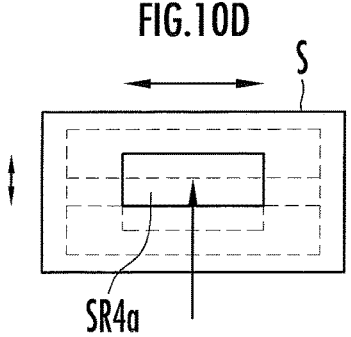

As illustrated in FIG. 10D, a laser beam emitted from the fourth excitation light source 14 is scanned in the horizontal direction and the vertical direction by the lower light deflector 16 and then scanned in a fourth scanning range SR4a of the virtual vertical screen S via the fluorescent unit 18 and the projector lens 3. In the present embodiment, the angle of the rotational movement in the horizontal direction and the vertical direction of the lower light deflector 16 are set to be smaller than the angle of the rotational movement in the horizontal direction and the vertical direction of the upper light deflector 15 thereby to make the third and the fourth scanning ranges SR3a and SR4a smaller than the first and the second scanning ranges SR1a and SR2a. Thus, using the upper light deflector 15 and the lower light deflector 16 permits the irradiation of light beams of different scanning ranges.

The first to the fourth scanning ranges SR1a to SR4a overlap at the central part in the vertical direction of the virtual vertical screen S.

As illustrated in FIG. 10E, due to the overlap of the first to the fourth scanning ranges SR1a to SR4a, the high beam light distribution pattern HP on the virtual vertical screen S is divided into a region P1a in which a single light beam is scanned, a region P2a in which two light beams are scanned, and a region P4a in which four light beams are scanned. According to the present embodiment, a highest intensity of light can be obtained in the region P4a, in which four light beams are scanned.

In the present embodiment, since the region P4a, in which four light beams are scanned, is located at the central part of the high beam light distribution pattern HP, a highest intensity of light can be obtained at the central part.

[Third Embodiment]

Figure 11:
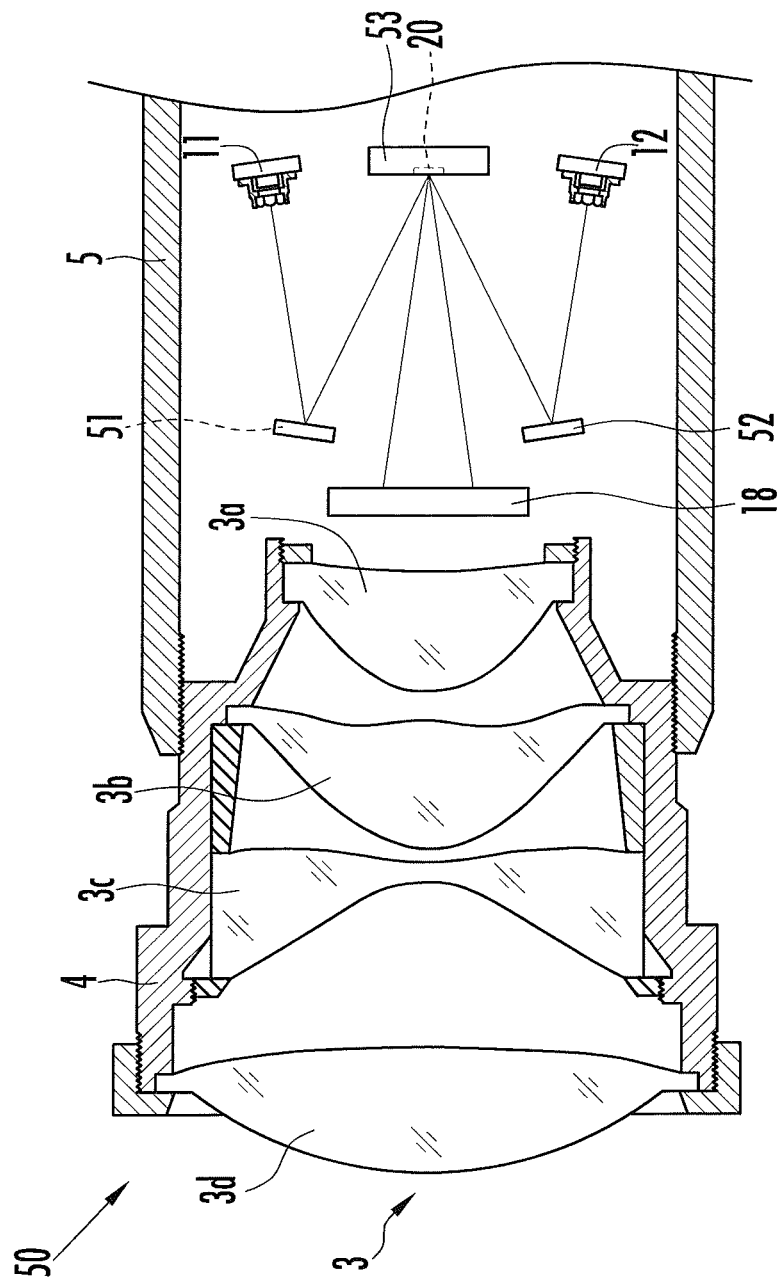
FIG. 11 is a sectional view of a vehicle lighting device according to a third embodiment.

According to the embodiment illustrated in FIG. 11 and FIG. 12, a vehicle lighting device 50 has a first reflection mirror 51, a second reflection mirror 52, and a light deflector 53 having the same configuration as that of the upper light deflector 15. The constituent members that are the same as those in the foregoing embodiments will be assigned the same reference symbols and the detailed descriptions thereof will be omitted.

The first reflection mirror 51 reflects a laser beam emitted from the first excitation light source 11 toward the rotational center of a light-deflecting mirror 20 of the light deflector 53. The second reflection mirror 52 reflects a laser beam emitted from the second excitation light source 12 toward the rotational center of the light-deflecting mirror 20 of the light deflector 53. Alternatively, only one reflection mirror may be provided and the two light beams emitted from the first and the second excitation light sources 11 and 12 may be reflected off of the same reflection mirror. In this case, a curved reflection mirror is used. Further, the correction mirror 17 may be provided between the light deflector 53 and the fluorescent unit 18.

Figure 12A:
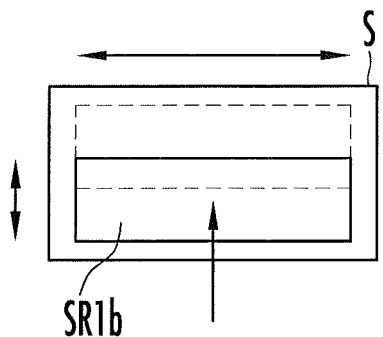
FIG. 12A to FIG. 12C are schematic diagrams in which FIG. 12A and FIG. 12B illustrating a first and a second scanning ranges on a virtual vertical screen in the third embodiment, and FIG. 12C illustrating a high beam light distribution pattern on the virtual vertical screen in the third embodiment.

As illustrated in FIG. 12A, after the laser beam emitted from the first excitation light source 11 is reflected off of the first reflection mirror 51, the reflected light beam is scanned in the horizontal direction and the vertical direction by the light deflector 53, and then scanned in a first scanning range SR1b of a virtual vertical screen S via a fluorescent unit 18 and a projector lens 3.

Figure 12B:
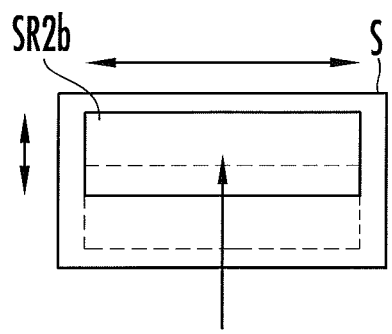

As illustrated in FIG. 12B, after the laser beam emitted from the second excitation light source 12 is reflected off of the second reflection mirror 52, the reflected light beam is scanned in the horizontal direction and the vertical direction by the light deflector 53, and then scanned in a second scanning range SR2*b* of the virtual vertical screen S via the fluorescent unit 18 and the projector lens 3.

The first scanning range SR1*b* and the second scanning range SR2*b* overlap at the central part in the vertical direction of the virtual vertical screen S.

Figure 12C:
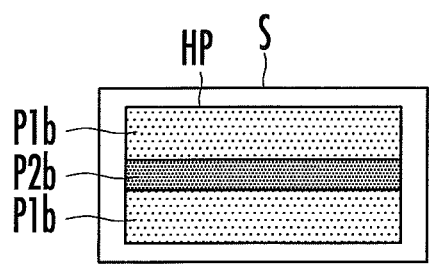

As illustrated in FIG. 12C, due to the overlap of the first scanning range SR1*b* and the second scanning range SR2*b*, a high beam light distribution pattern HP on the virtual vertical screen S is divided into a region P1*b* in which a single light beam is scanned and a region P2*b* in which two light beams are scanned. According to the present embodiment, a highest intensity of light can be obtained in the region P2*b*, in which two light beams are scanned.

According to the present embodiment, the region P2*b*, in which two light beams are scanned, is located at the central part of the high beam light distribution pattern HP, thus enabling the central part to have a highest intensity of light.

[Fourth Embodiment]

The embodiment illustrated in FIG. 13 includes three excitation light sources, which have the same configurations as those in the foregoing embodiments, and one light deflector. Under the same control as that in the foregoing embodiments, the light beams from the excitation light sources are scanned in a first scanning range SR1*c* (FIG. 13A), a second scanning range SR2*c* (FIG. 13B), and a third scanning range SR3*c* (FIG. 13C) of a virtual vertical screen S. The same constituent members as those in the foregoing embodiments will be assigned the same reference symbols and the detailed description thereof will be omitted.

The first scanning range SR1*c*, the second scanning range SR2*c*, and the third scanning range SR3*c* overlap at the central part in the vertical direction of the virtual vertical screen S.

Figure 13A:
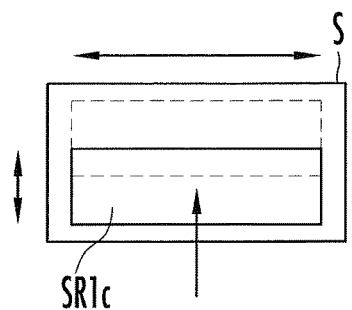
FIG. 13A to FIG. 13D are schematic diagrams, in which FIG. 13A to FIG. 13C illustrating a first to a third scanning ranges on a virtual vertical screen in a fourth embodiment, and FIG. 13D illustrating a high beam light distribution pattern on the virtual vertical screen in the fourth embodiment.
Figure 13B:
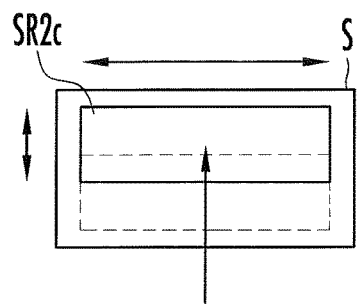
Figure 13C:
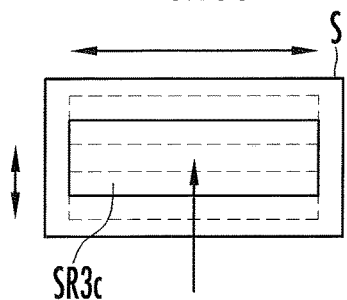
Figure 13D:
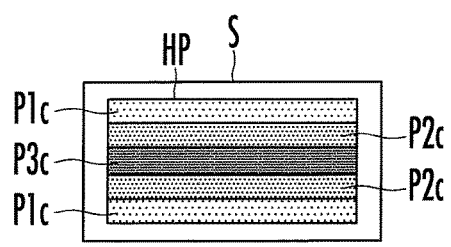

As illustrated in FIG. 13D, due to the overlap of the first to the third scanning ranges SR1*c* to SR3*c*, a high beam light distribution pattern HP on the virtual vertical screen S is divided into a region P1*c* in which a single light beam is scanned, a region P2*c* in which two light beams are scanned, and a region P3*c* in which three light beams are scanned. According to the present embodiment, a highest intensity of light can be obtained in the region P3*c*, in which three light beams are scanned.

In the present embodiment, since the region P3*c*, in which three light beams are scanned, is located at the central part of the high beam light distribution pattern HP, a highest intensity of light can be obtained at the central part.

[Fifth Embodiment]

The embodiment illustrated in FIG. 14 includes five excitation light sources, which have the same configurations as those in the foregoing embodiments, and two light deflectors. The light beams from the excitation light sources are scanned in a first scanning range SR1*d* (FIG. 14A), a second scanning range SR2*d* (FIG. 14B), a third scanning range SR3*d* (FIG. 14C), a fourth scanning range SR4*d* (FIG. 14D), and a fifth scanning range SR5*d* (FIG. 14E) of a virtual vertical screen S under the same control as that in the foregoing embodiments. The same constituent members as those in the foregoing embodiments will be assigned the same reference symbols and the detailed description thereof will be omitted. The embodiment may be provided with one light deflector.

The first to the fifth scanning ranges SR1*d* to SR5*d* overlap on the virtual vertical screen S.

Figure 14A:
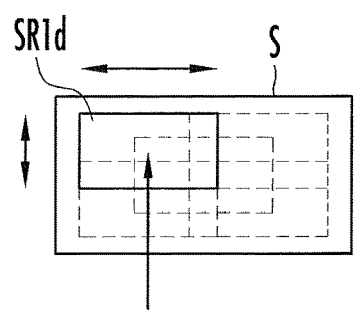
FIG. 14A to FIG. 14F are schematic diagrams in which FIG. 14A to FIG. 14E illustrating a first to a fifth scanning ranges on a virtual vertical screen in a fifth embodiment, and FIG. 14F illustrating a high beam light distribution pattern on the virtual vertical screen in the fifth embodiment.
Figure 14E:
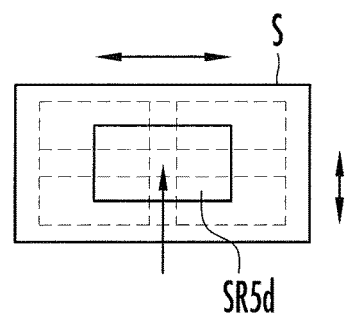
Figure 14B:
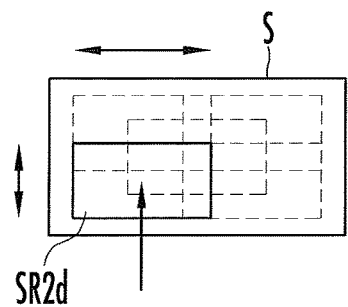
Figure 14F:
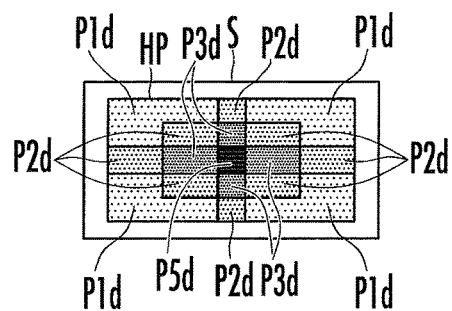
Figure 14C:
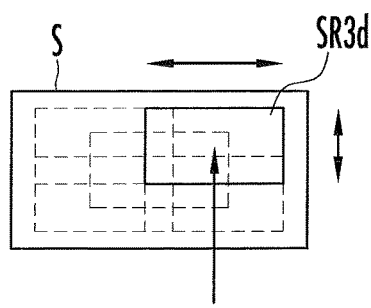
Figure 14D:
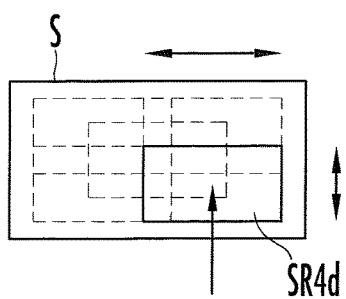

As illustrated in FIG. 14F, due to the overlap of the first to the fifth scanning ranges SR1*d* to SR5*d*, a high beam light distribution pattern HP on the virtual vertical screen S is divided into a region P1*d* in which a single light beam is scanned, a region P2*d* in which two light beams are scanned, a region P3*d* in which three light beams are scanned, and a region P5*d* in which five light beams are scanned. According to the present embodiment, a highest intensity of light can be obtained in the region P5*d*, in which five light beams are scanned.

In the present embodiment, since the region P5*d*, in which five light beams are scanned, is located at the central part of the high beam light distribution pattern HP, a highest intensity of light can be obtained at the central part. Further, in the high beam light distribution pattern HP, the intensity of light gradually decreases outward from the central part having the highest intensity of light.

[Sixth Embodiment]

The embodiment illustrated in FIG. 15 includes six excitation light sources, which have the same configurations as those in the foregoing embodiments, and two light deflectors. The light beams from the excitation light sources are scanned in a first scanning range SR1*e* (FIG. 15A), a second scanning range SR2*e* (FIG. 15B), a third scanning range SR3*e* (FIG. 15C), a fourth scanning range SR4*e* (FIG. 15D), a fifth scanning range SR5*e* (FIG. 15E), and a sixth scanning range SR6*e* (FIG. 15F) of a virtual vertical screen S under the same control as that in the foregoing embodiments. The same constituent members as those in the foregoing embodiments will be assigned the same reference symbols and the detailed description thereof will be omitted. The number of the light deflectors may be one or three.

The first to the sixth scanning ranges SR1*e* to SR6*e* overlap on the virtual vertical screen S.

Figure 15A:
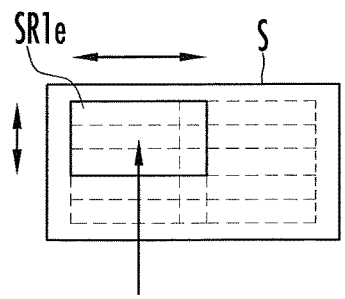
FIG. 15A to FIG. 15G are schematic diagrams in which FIG. 15A to FIG. 15F illustrating a first to a sixth scanning ranges on a virtual vertical screen in a sixth embodiment, and FIG. 15G illustrating a high beam light distribution pattern on the virtual vertical screen in the sixth embodiment.
Figure 15E:
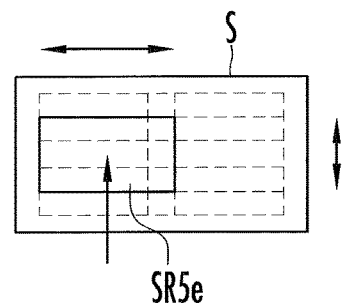
Figure 15B:
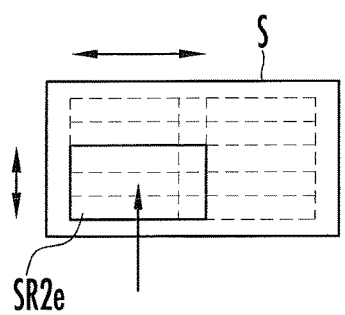
Figure 15F:
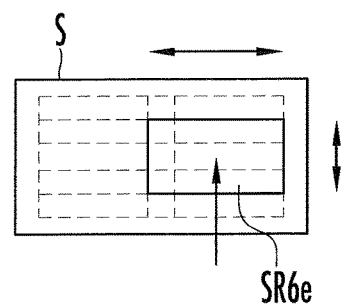
Figure 15C:
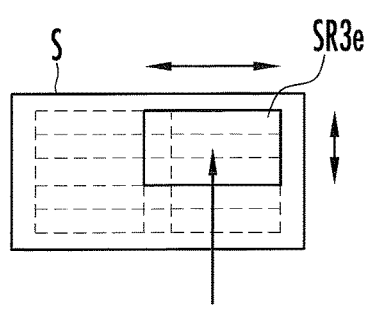
Figure 15G:
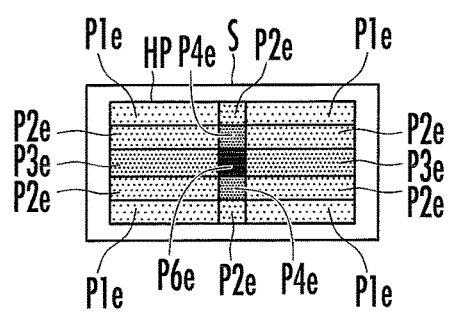
Figure 15D:
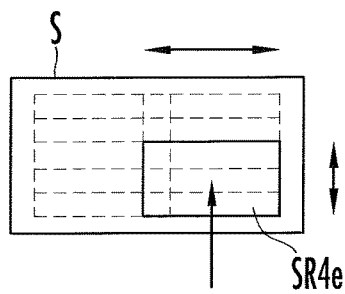

As illustrated in FIG. 15G, due to the overlap of the first to the sixth scanning ranges SR1*e* to SR6*e*, a high beam light distribution pattern HP on the virtual vertical screen S is divided into a region P1*e* in which a single light beam is scanned, a region P2*e* in which two light beams are scanned, a region P3*e* in which three light beams are scanned, a region P4*e* in which four light beams are scanned, and a region P6*e* in which six light beams are scanned. According to the present embodiment, a highest intensity of light can be obtained in the region P6*e*, in which six light beams are scanned.

In the present embodiment, since the region P6*e*, in which six light beams are scanned, is located at the central part of the high beam light distribution pattern HP, a highest intensity of light can be obtained at the central part. Further, in the high beam light distribution pattern HP, the intensity of light gradually decreases outward from the central part having the highest intensity of light.

Also in the fourth to the sixth embodiments described above, the laser beams from a plurality of excitation light sources are incident to a single light deflector, and the laser beams are incident to the rotational center of a light-deflecting mirror of the light deflector.

The position of the light-deflecting mirror to which a plurality of laser beams are incident is not limited to the rotational center, and may alternatively be another position on the light-deflecting mirror insofar the light beams are incident to the same position.

In the foregoing embodiments, the scanning ranges of a plurality of light beams are partly overlapped. Alternatively, however, the scanning ranges may not be overlapped.

In the foregoing second to the foregoing sixth embodiments also, the brightness of the excitation light sources 11 to 14 may be controlled to form the elliptical high beam light distribution pattern illustrated in FIG. 8.

Further, in the foregoing second to the foregoing sixth embodiments also, the number of the light deflectors or the number of the excitation light sources that emit light beams to a single light deflector can be changed as appropriate.

In the first to the sixth embodiments described above, the single optical system emits light beams to the virtual vertical screen; however, the present invention is not limited thereto. Alternatively, the light beams from a plurality of optical systems may be overlapped on a virtual vertical screen. In this case, at least one of the optical systems is to scan the light beams from a plurality of light sources by a single light deflector in different scanning ranges, as with the first to the sixth embodiments described above.

Further, in the first to the sixth embodiments described above, excitation light sources are used. Alternatively, however, light sources adapted to emit beams of their colors themselves may be used. In this case, the fluorescent unit (projecting unit) will be unnecessary, and the light from the light sources will be directly emitted. Further alternatively, a translucent diffuser panel may be used in place of the fluorescent unit. In addition, any types of light sources may be used insofar as the light sources emit one bundle of light beams, and light may be guided by, for example, a fiber. The light guided to the fiber may be a RGB-mixed white light.

What is claimed is:

1. A vehicle lighting device configured to form a predetermined light distribution pattern, comprising:
    a plurality of light sources that emit light beams;
    a light-deflecting mirror which is disposed such that a plurality of light beams emitted from the plurality of light sources are incident at a same predetermined position and which reflects the plurality of light beams;
    a light deflector which scans the plurality of light beams two-dimensionally in the horizontal direction and the vertical direction by changing reflection directions of the plurality of light beams reflected by the light-deflecting mirror; and
    an optical system which forms the predetermined light distribution pattern by projecting a two-dimensional image drawn by the plurality of light beams scanned by the light deflector, wherein
    each of the light beams emitted from the plurality of light sources enters the light-deflecting mirror at a same predetermined position and from different angles,
    the plurality of light beams reflected by the light-deflecting mirror are separated and irradiated at different positions,
    each of the plurality of light beams is scanned to form a scanning range including a mutually non-overlapping region, and
    the scanning range formed by each of the plurality of light beams is formed at a position displaced in the horizontal direction.

2. The vehicle lighting device according to claim 1, wherein
    scanning ranges of the plurality of light beams are at least partly overlapped.

3. The vehicle lighting device according to claim 2, wherein a light intensity of the overlapped region of the scanning ranges of the plurality of light beams is higher compared to the non-overlapping region of the scanning ranges of the plurality of light beams.

4. The vehicle lighting device according to claim 1, comprising:
    a correction mirror which is provided between the light deflector and the optical system, and which corrects distortion of the plurality of light beams scanned by the light deflector, and reflects the corrected light beams.

5. The vehicle lighting device according to claim 1, comprising:
    a reflection mirror which is provided between the plurality of light sources and the light deflector, and which reflects the plurality of light beams, which have been emitted from the plurality of light sources, toward the predetermined position of the light-deflecting mirror.

6. The vehicle lighting device according to claim 1, comprising:
    a projection unit on which an image is drawn by the plurality of light beams scanned by the light deflector,
    wherein the optical system projects the image drawn on the projection unit thereby to form the predetermined light distribution pattern.

7. The vehicle lighting device according to claim 6, wherein the projection unit is translucent, and
    the optical system is arranged so as to face a surface of the projection unit which is opposite to a surface to which the scanned light beams enter.

8. The vehicle lighting device according to claim 1, wherein
    the light deflector includes an actuator and a support structure, and the actuator is configured to cause the support structure to reciprocate and scan the plurality of light beams.

9. The vehicle lighting device according to claim 1, wherein
    the light deflector includes an actuator driven by any one of a piezoelectric method, an electrostatic method, and an electromagnetic method.

10. The vehicle lighting device according to claim 1, further comprising:
    a plurality of the light deflectors, and
    a plurality of light-deflecting mirrors, wherein
    the light beams from the plurality of light sources enter each of the plurality of light-deflecting mirrors.

11. A vehicle lighting device configured to form a predetermined light distribution pattern, comprising:
    a plurality of light sources that emit light beams;
    a light-deflecting mirror which is disposed such that a plurality of light beams emitted from the plurality of light sources are incident at a same predetermined position on the light-flecting mirror and which reflects the plurality of light beams;
    a light deflector which scans the plurality of light beams two-dimensionally in the horizontal direction and the vertical direction by changing reflection directions of the plurality of light beams reflected by the light-deflecting mirror; and
    an optical system which forms the predetermined light distribution pattern by projecting a two-dimensional image drawn by the plurality of light beams scanned by the light deflector, wherein
    each of the light beams emitted from the plurality of light sources enters the light-deflecting mirror at a same predetermined position and from different angles,
    the plurality of light beams reflected by the light-deflecting mirror are separated and irradiated at different positions,
    each of the plurality of light beams is scanned thereby to form a scanning range including a mutually non-overlapping region, and
    the scanning range formed by each of the plurality of light beams is formed at a position displaced in the vertical direction.

12. The vehicle lighting device according to claim 11, wherein
the light deflector includes an actuator and a support structure, and the actuator is configured to cause the support structure to reciprocate and scan the plurality of light beams.

\* \* \* \* \*